(12) United States Patent
Ménard et al.

(10) Patent No.: US 9,078,523 B2
(45) Date of Patent: Jul. 14, 2015

(54) ELECTRONIC DISPLAY FOR VIBRO-KINETIC PLATFORM

(75) Inventors: Jean-François Ménard, Boucherville (CA); Pierre Sénécal, Boucherville (CA); Martin Simoneau, Sherbrooke (CA); Sylvain Trottier, St-Lambert (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 521 days.

(21) Appl. No.: 13/251,402

(22) Filed: Oct. 3, 2011

(65) Prior Publication Data

US 2012/0019030 A1 Jan. 26, 2012

Related U.S. Application Data

(63) Continuation-in-part of application No. 13/070,332, filed on Mar. 23, 2011, which is a continuation-in-part of application No. 12/249,919, filed on Oct. 11, 2008, now Pat. No. 7,934,773.

(51) Int. Cl.

| | |
|---|---|
| *A47C 15/00* | (2006.01) |
| *A47C 31/00* | (2006.01) |
| *A47C 1/12* | (2006.01) |
| *A47C 7/72* | (2006.01) |
| *A63J 25/00* | (2009.01) |
| *A63F 13/98* | (2014.01) |
| *G09F 9/30* | (2006.01) |
| *A63G 31/04* | (2006.01) |
| *A47C 7/00* | (2006.01) |

(Continued)

(52) U.S. Cl.
CPC . *A47C 1/12* (2013.01); *A47C 7/002* (2013.01);
*A47C 7/72* (2013.01); *A63F 13/02* (2013.01);
*A63F 13/06* (2013.01); *A63G 31/04* (2013.01);
*A63J 25/00* (2013.01); *G06F 3/016* (2013.01);
*G09F 9/30* (2013.01); *A63F 2300/1037*
(2013.01); *A63F 2300/302* (2013.01); *A63F 2300/8017* (2013.01)

(58) Field of Classification Search
CPC ............. A47C 1/12; A47C 7/62; A63G 31/16;
A04N 7/181; G09B 9/02; G09B 9/12; G09B 9/04; G90B 9/05
USPC ............................................... 297/217.3, 232
See application file for complete search history.

(56) References Cited

U.S. PATENT DOCUMENTS

| | | |
|---|---|---|
| 3,577,655 A | 5/1971 | Pancoe |
| 3,645,011 A | 2/1972 | Callanen |

(Continued)

*Primary Examiner* — Sarah B McPartlin
(74) *Attorney, Agent, or Firm* — Norton Rose Fulbright Canada LLP

(57) ABSTRACT

The present document describes a vibro-kinetic seating kit for providing seating to a user at a seating location in a multi-seating environment comprising other seating locations and for rendering a vibro-kinetic effect to the user. The vibro-kinetic seating kit comprises an electronic display and a vibro-kinetic platform which comprises a seat portion associated with the seating location and for providing the seating to the user; and an actuation system mechanically connected to the seat portion for rendering the vibro-kinetic effect to the user. The electronic display associated to the vibro-kinetic platform is for receiving display data and for electronically showing visual information indicative of the display data which comprises an identification tag for the seating location relative to the other seating locations in the multi-seating environment.

18 Claims, 6 Drawing Sheets

(51) Int. Cl.
*A63F 13/20* (2014.01)
*G06F 3/01* (2006.01)

(56) References Cited

U.S. PATENT DOCUMENTS

| | | | |
|---|---|---|---|
| 3,923,300 A | 12/1975 | Tanus | |
| 4,066,256 A | 1/1978 | Trumbull | |
| 5,009,412 A | 4/1991 | Roodenburg et al. | |
| 5,022,384 A | 6/1991 | Freels et al. | |
| 5,022,708 A | 6/1991 | Nordella et al. | |
| 5,486,141 A * | 1/1996 | Ohga et al. | 472/60 |
| 5,496,220 A | 3/1996 | Engstrand | |
| 5,605,462 A | 2/1997 | Denne | |
| 5,674,127 A * | 10/1997 | Horstmann et al. | 463/42 |
| 5,678,889 A | 10/1997 | Purcell | |
| 5,835,715 A * | 11/1998 | Dahl | 709/209 |
| 5,954,508 A | 9/1999 | Lo et al. | |
| 6,056,362 A | 5/2000 | de la Haye | |
| 6,162,058 A | 12/2000 | Yang | |
| 6,396,462 B1 | 5/2002 | Mead, Jr. et al. | |
| 6,413,090 B1 | 7/2002 | Shiina et al. | |
| 6,733,293 B2 * | 5/2004 | Forster et al. | 434/55 |
| 6,793,495 B2 | 9/2004 | Kang | |
| 7,382,830 B2 | 6/2008 | Kondo et al. | |
| 7,402,041 B2 * | 7/2008 | Nelms et al. | 434/55 |
| 2005/0277092 A1 | 12/2005 | Hwang | |
| 2006/0046230 A1 | 3/2006 | MacDonald | |
| 2007/0111774 A1 * | 5/2007 | Okada | 463/16 |
| 2008/0009776 A1 | 1/2008 | Trandafir | |
| 2010/0030122 A1 * | 2/2010 | Gaspard | 601/136 |
| 2010/0205867 A1 * | 8/2010 | Park | 52/8 |
| 2010/0332004 A1 * | 12/2010 | Paillard | 700/94 |
| 2011/0043006 A1 * | 2/2011 | Butt et al. | 297/68 |
| 2011/0055720 A1 * | 3/2011 | Potter et al. | 715/747 |
| 2012/0203378 A1 * | 8/2012 | Yank, III | 700/275 |

* cited by examiner

ELECTRONIC DISPLAY FOR VIBRO-KINETIC PLATFORM

CROSS-REFERENCE TO RELATED APPLICATIONS

This application is a continuation-in-part of U.S. application Ser. No. 13/070,332 filed Mar. 23, 2011, which is a continuation-in-part of U.S. application Ser. No. 12/249,919 filed Oct. 11, 2008.

TECHNICAL FIELD

This description relates to the field of vibro-kinetic platforms. More particularly, this description relates to control panels for vibro-kinetic platforms.

BACKGROUND

Prior art systems include motion simulators and motion chairs (aka vibro-kinetic simulators and platforms) used in homes, in video game arcades and in attraction park rides.

There is a need to introduce the technology of providing a vibro-kinetic effect motion in seats installed in movie theatres or other venues with control panels to customize the user's experience. In the context of a movie theatre and other venues, restrictions relative to customization of a user's experience on each individual seat are present and need to be overcome.

SUMMARY

According to an embodiment, there is provided a vibro-kinetic seating kit for providing seating to a user at a seating location in a multi-seating environment comprising other seating locations and for rendering a vibro-kinetic effect to the user. The vibro-kinetic seating kit comprises an electronic display and a vibro-kinetic platform which comprises a seat portion associated with the seating location and for providing the seating to the user; and an actuation system mechanically connected to the seat portion for rendering the vibro-kinetic effect to the user. The electronic display associated to the vibro-kinetic platform is for receiving display data and for electronically showing visual information indicative of the display data which comprises an identification tag for the seating location relative to the other seating locations in the multi-seating environment.

According to another aspect, the vibro-kinetic platform further comprises a user input device for receiving actions from the user and producing input commands based on the received actions.

According to another aspect, the user input device comprises at least one of a touch screen, touch sensitive input device, a keyboard, a pointing device, a switch, a knob and a pushbutton.

According to another aspect, the vibro-kinetic platform further comprises a vibro-kinetic controller for receiving a vibro-kinetic signal and communicating the vibro-kinetic signal to the actuation system, the actuation system rendering the vibro-kinetic effect to the user based on a vibro-kinetic signal.

According to another aspect, the vibro-kinetic controller is for receiving at least one of the input commands and for altering the vibro-kinetic signal sent to the actuation system based on the at least one of the input commands thus altering the vibro-kinetic effect rendered to the user.

According to another aspect, the at least one of the input commands is for controlling at least one of an intensity of vibration and an intensity of movement. According to another aspect, the display data further comprises at least one of: at least one of the input commands; and an operational state of the vibro-kinetic platform affected by at least one of the input commands.

According to another aspect, the display data further comprises a reservation state indicative of whether or not the seating location is reserved for the user.

According to another aspect, the vibro-kinetic platform further comprises an occupation detector for detecting the presence of the user in the seating location and for producing an occupation state signal indicative of the presence, and wherein the occupation state affects at least one of the information and a format of the information appearing on the electronic display.

According to another aspect, the electronic display is further for showing an operational state of the vibro-kinetic platform.

According to another aspect, the electronic display is further for showing visual information which comprises at least one of: an error message, an advertisement, a user survey, an image, an animation, a game, instructions for operating the vibro-kinetic platform, emergency information and information concerning an event.

According to another aspect, the visual information concerning an event comprises at least one of statistical data of the event, scheduling data of the event, location of the event, images related to the event, and video related to the event.

According to another aspect, the electronic display is installed on the seat portion.

According to an embodiment, there is provided a vibro-kinetic seating kit for providing seating to a user and for rendering a vibro-kinetic effect to the user. The vibro-kinetic seating kit comprises an electronic display and a vibro-kinetic platform which comprises: a seat portion for providing the seating to the user; and an actuation system mechanically connected to the seat portion for rendering the vibro-kinetic effect to the user. The electronic display is associated to the vibro-kinetic platform for showing visual information indicative of data concerning an event.

According to another aspect, the data is provided from one or more subject involved in the event.

According to another aspect, at least one of the one or more subject is one of a virtual subject and a real subject.

According to another aspect, the event comprises one of a virtual game and a live event.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
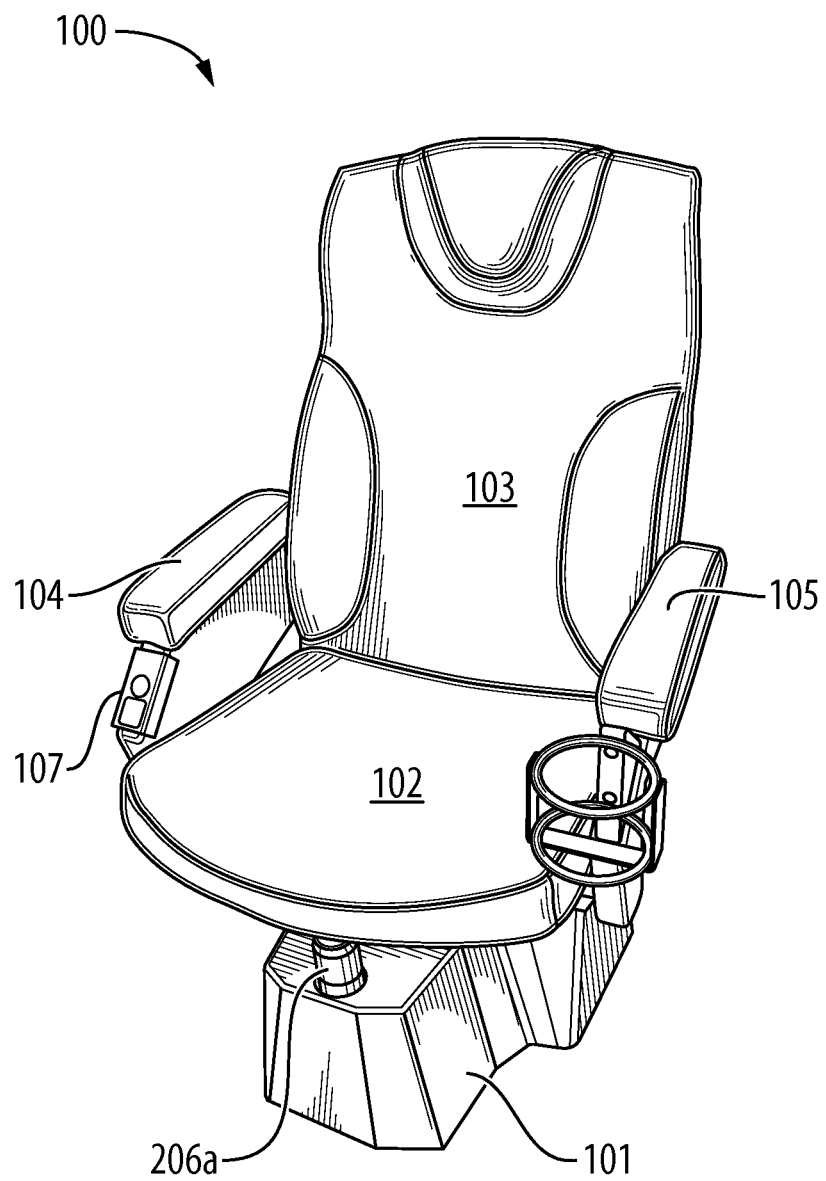
FIG. 1 is a perspective view of a vibro-kinetic platform according to an embodiment.
Figure 2:
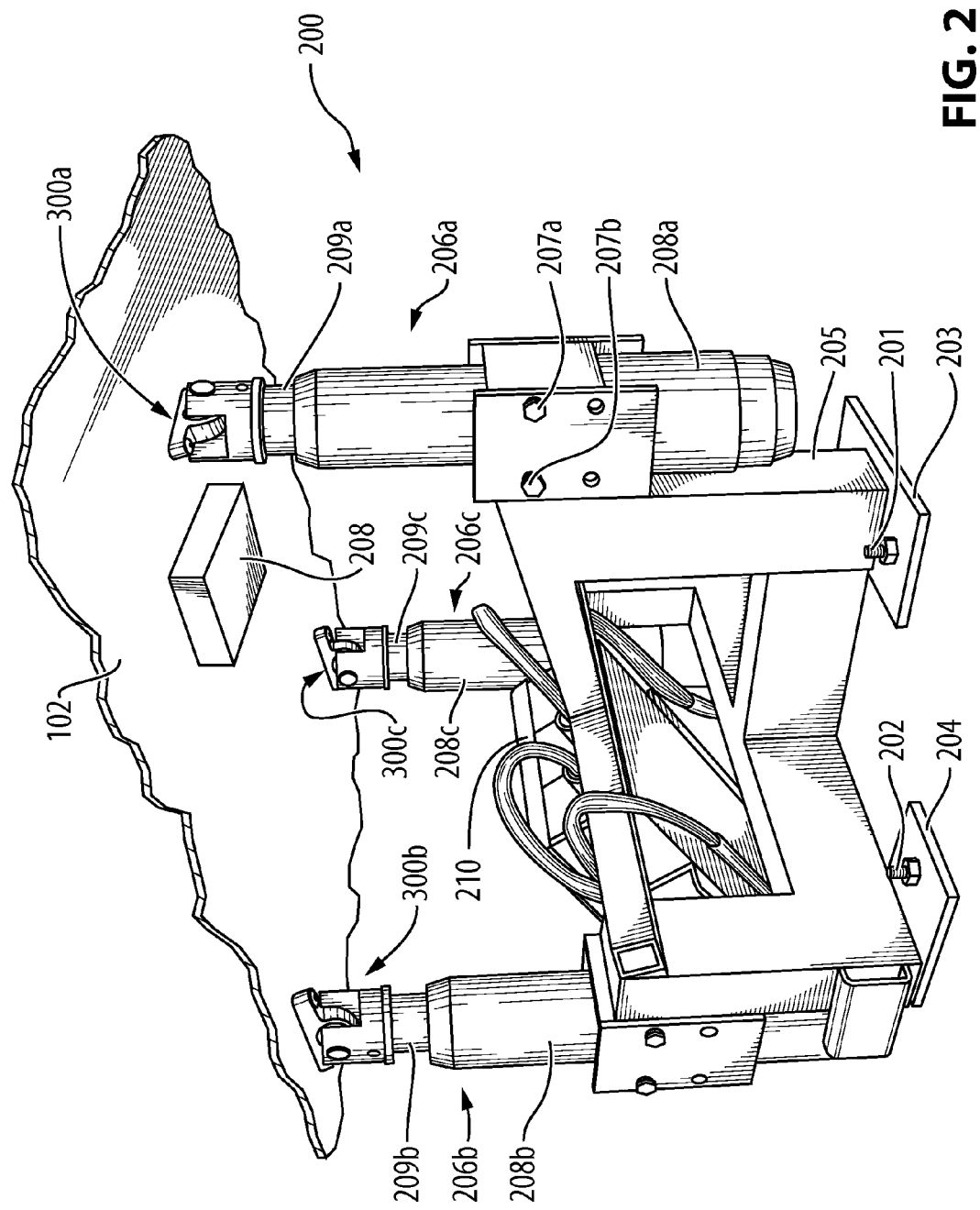
FIG. 2 is a perspective view of an actuated base according to an embodiment.

Referring to the drawings, and more particularly to FIGS. 1 and 2, vibro-kinetic platform 100 (FIG. 1) is shown. In the literature, a vibro-kinetic platform is sometimes also referred to as a motion-enabled platform, a motion-enabled chair, a motion platform or a motion chair. The actuation system 200 (FIG. 2) of the vibro-kinetic platform 100 lies on the ground (or is anchored to the ground) and is covered by a protective cover 101. The actuation system 200 is also referred to herein as an actuation system. The seating portion of the vibro-kinetic platform 100 is very similar to a standard movie chair or seat and comprises a seat base 102, a backrest 103 and armrests 104-105. Although the vibro-kinetic platform 100 shown in FIG. 1 is designed for one user/movie viewer, it is understood that the concepts described herein extend to multi-user vibro-kinetic platform as well.

Between the protective cover 101 and the seat base 102 there may be a protection skirt (not shown) for preventing users from injury while viewing a moving which comprising vibro-kinetic effects. According to an embodiment, the terms "protective cover" includes the protection skirt. The protection skirt is horizontally wrinkled and made of flexible material to adjust itself during the actuating (movement of the vibro-kinetic platform).

Below the right armrest 104, a control panel 107 is accessible to the user for controlling the intensity (e.g., the amplitude range of the actuators 206a-b-c) of the vibro-kinetic effect inducing in the vibro-kinetic platform 100. Some of the options (i.e., modes of operation) include "Off" (i.e., no motion/vibro-kinetic effect), "Light" (i.e., reduced motion//vibro-kinetic effect), "Normal" (i.e., regular motion//vibro-kinetic effect), "Heavy" (i.e., maximum motion//vibro-kinetic effect), "Discreet" (i.e., fully controllable motion/vibro-kinetic effect level between "Off" and "Heavy"), and "Automatic". Optionally, a vibration signal, a sound signal or light signal is provided to the user to indicate in which mode of operation or at which intensity level the vibro-kinetic platform 100 is operating.

In the "Automatic" mode, the vibro-kinetic platform 100 uses a sensor (not shown) to detect a characteristic of the user (e.g., weight) and, based on the characteristic, determines the setting for the level of vibro-kinetic effect that will be induced in the vibro-kinetic platform 100. The sensor function can be achieved by a combination of feedback through one or more actuators 206a-b-c and software algorithm hosted in the processor (not shown) of the controller 210. The weight sensor function can also be achieved by using a separate sensor 208 (see FIG. 2) installed on the vibro-kinetic platform 100. Sensor 208 is in communication (wired or wireless) with the controller 210 to determine, using a software algorithm, a characteristic of the user. The control panel 107 is therefore in communication with the controller 210.

The following embodiments are described with reference to a vibro-kinetic platform which includes, as a non limiting example, a motion-enabled chair. Different platforms and/or chairs may be used in the present embodiments without departing from the scope of this document. Other examples of vibro-kinetic platforms include shakers and tactile transducers.

Figure 6:
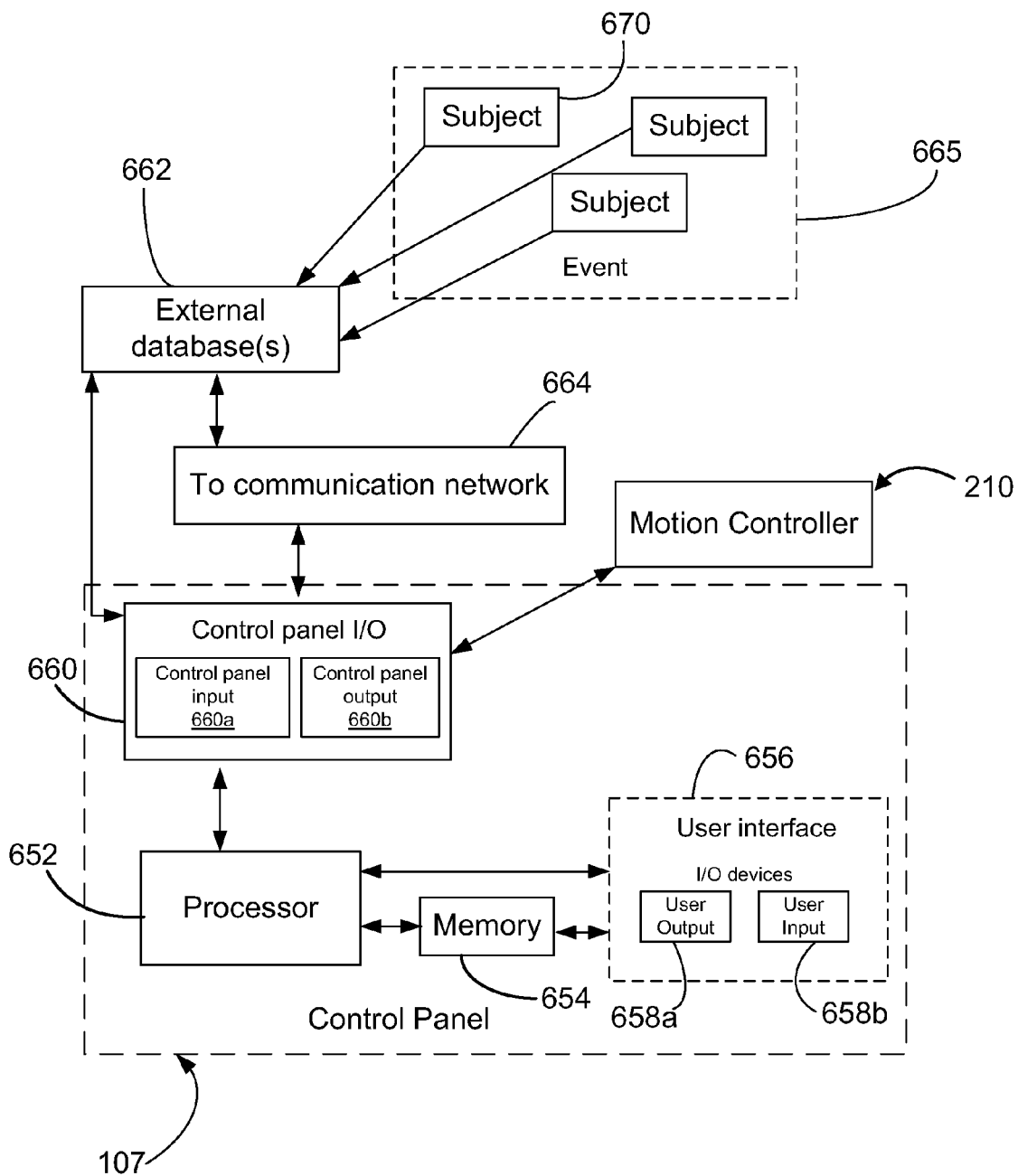
FIG. 6 is a block diagram of the control panel according to an embodiment of the present invention.

Now referring to FIGS. 6, 1 and 2, there is provided, according to an embodiment, a vibro-kinetic platform 100 for providing seating to a user (not shown) at a seating location in a multi-seating environment (not shown) comprising other seating locations and for rendering a vibro-kinetic effect to the user. The vibro-kinetic platform 100 comprises a seat portion (e.g., at least one of seat base 102, backrest 103 and armrests 104-105) associated with the seating location and for providing the seating to the user.

The vibro-kinetic platform 100 also comprises an actuation system 200 mechanically connected to the seat portion for rendering the vibro-kinetic effect to the user. The vibro-kinetic platform 100 further comprises a user output device 658a (aka an electronic display) mounted on the vibro-kinetic platform 100 such that it is viewable by the user while seated in the vibro-kinetic platform 100 and for showing an identification tag for the seating location relative to the other seating locations in the multi-seating environment.

Still referring to FIGS. 6 and 1, there is shown a block diagram of a control panel 107 for installation on a vibro-kinetic platform 100 which is for providing seating and rendering a vibro-kinetic effect to a user. The control panel includes a processor 652 having access to instructions stored in memory 654. The memory 654 is operatively coupled to the processor 652 for storing the instructions to be performed by the processor 652. The control panel 107 also includes a user interface 656 for providing content to the user and for receiving a selection from the user.

The processor 652 executes the instructions from the memory which causes it to: send a content signal to the user output 658a (the content signal for configuring the user interface 656 to provide the content thereon); receive the selection from the user from the user interface 656 (user input 658b); and communicate the selection from the user to at least one of: a) a device that is external to the vibro-kinetic platform 100; b) the vibro-kinetic platform 100 for controlling the vibro-kinetic platform 100; and c) the user output 658a for altering the content.

The control panel 107 also comprises a housing (not shown) which contains the user interface 656, the memory 654 and the processor 652, and which is attached to the vibro-kinetic platform 100, for example, below armrest 104.

According to an embodiment, the user interface 656 may include devices such as user input 658b and user output 658a. For example, the user input 658b and user output 658a may be combined in a tactile screen (touch screen) capable of displaying the information and respond to the user's tactile selection. The user input 658b may also be separate user output 658a. The user output 658a may include, without limitation, electronic display devices, such as liquid crystal displays, and audio speakers. The user input 658b may include, without limitation, keyboards, keypads or buttons capable of receiving a user's selection.

According to an embodiment, the control panel input/output 660 which is in communication with remote equipment such as a server, a controller or a database. More specifically, the control panel input/output 660 includes control panel output 660b, which is in communication with a controller 210 of the vibro-kinetic platform 100 to control the vibro-kinetic effect intensity of the vibro-kinetic platform 100 as described above. The user may select, through the user interface 656 of the control panel 107, the vibro-kinetic effect intensity of the vibro-kinetic platform 100. The vibro-kinetic effect intensity may be modulated by decreasing or increasing either of the intensity of the vibro-kinetic platform's vibration, the intensity of movement of the vibro-kinetic platform 100, or their combination.

According to another embodiment, the control panel 107 may display many types of relevant content. These include without limitation, the operation instructions of the vibro-kinetic platform 100, the state of the vibro-kinetic platform 100, including error messages, or a message that the vibro-kinetic platform 100 has been reserved or is available for use. The content displayed may also be specific identifications tags such as VIP tags, or handicapped tags, or tags for special room configurations when multiple vibro-kinetic platforms 100 are employed. The content may also be the state of the vibro-kinetic platform 100 during maintenance or troubleshooting of the vibro-kinetic platform 100, or an out-of-order message, or a message that the vibro-kinetic platform 100 is operational or combinations thereof.

According to another embodiment, the control panel 107 may include control panel input 660a, that is used for providing to the control panel 107 content from external database or databases 662, or instructions from a server or controller. The control panel input 660a may be in communication with a plurality of different external databases to retrieve varied content. The content from an external database 662 are sent to the user interface 656 by the processor 652, which receives the selection from a user from the user interface 656, and communicates the selection to the control panel output 660b. The control panel output 660b may be in communication with a controller 210 of the vibro-kinetic platform 100 for controlling a vibro-kinetic effect intensity of the vibro-kinetic platform 100 (as described above), with the one or more external databases 662 or combinations thereof. The external databases 662 may be available via a communication network 664. The communication network 664 may be a wired network, or it may be a wireless network.

The content from external databases 662 may be varied. They may include for example and without limitations, the availability state of the vibro-kinetic platform 100 (e.g., reserved or available) which may be tallied at the entrance of a facility using the vibro-kinetic platforms 100 (e.g., a movie theatre), or from an online or telephonic reservation system. The content may be publicity, advertisement, user surveys (e.g., a survey on the event or activity attended by the user), games, vibro-kinetic platform 100 identification tags (e.g., a VIP tag, a color coding, etc) which may be employed during certain specific events. The content may also be emergency information displayed during an emergency situation, directing the user to the nearest designated exit, or instructing the user to remain seated, for example.

According to another embodiment, the content may be information concerning an event. Events may be for example, movies, concerts, plays, races, sports games, video games (e.g., flight simulators) or physical games (e.g., radio guided car or planes, or any type of event that may benefit from the augmented reality experience of the present invention. The events may be pre-recorded, or they may be real-time events. The real-time events may be a live event attended by the user and/or an event taking place at a remote location. Examples of such real-time events include, but are not limited to concerts, plays, races, sports games, etc. The content concerning an event may include any type of data that may be relevant to the event and/or performance and includes without limitations statistical data of the event (e.g., statistical or personal information on the performers or players), programming data of the event (e.g., the chapters of a play, upcoming activities, etc), visual data of the event (e.g., photographs or still images of a performance or images accompanying an audio concert), video data of the event (e.g., a live video feeds of the event from different locations or point of views at the site), audio data of the event (e.g., accompanying music, or audio commentaries or dialogues) as well as vibro-kinetic effect data selection representative of the event for controlling the vibro-kinetic platform 100.

According to an embodiment, the information concerning an event may be a uniform set of information (e.g., one set of statistics, visual, video, audio or vibro-kinetic effect information) which may be uniformly accessed by all users. According to another embodiment, the information concerning an event may be provided from one or more subjects 670 involved in the event 665, each of which may be selected by the user through the user interface 656. For example, the vibro-kinetic platform 100 may be provided in a location where a live event takes place, whereby, the user experiences movements that correspond to the movements of a subject they watch directly on stage (e.g., a performer or a cameraman). In another embodiment, the user may be watching a live event aired on TV and experience movements that correspond to the movements of a subject 670 which is displayed on the screen, in real-time (e.g., a player at a sports event, a car in a race, etc). In other embodiments, the user may switch between movements that correspond to the movements of a subject 670 they watch directly on stage, to that of another subject 670.

Generation of the content concerning events 665 that are to be transmitted to the control panel 107 and the vibro-kinetic platform 100 may be performed in real-time, with a latency that is substantially un-detectable by the user (occupant of the vibro-kinetic platform 100). The "real-time" criteria will vary depending on the contemplated application. As long as the vibro-kinetic effect is synchronized with the audio, video or other information provided to the user, the vibro-kinetic platform 100 is considered to provide a vibro-kinetic effect in real-time.

Figure 7:
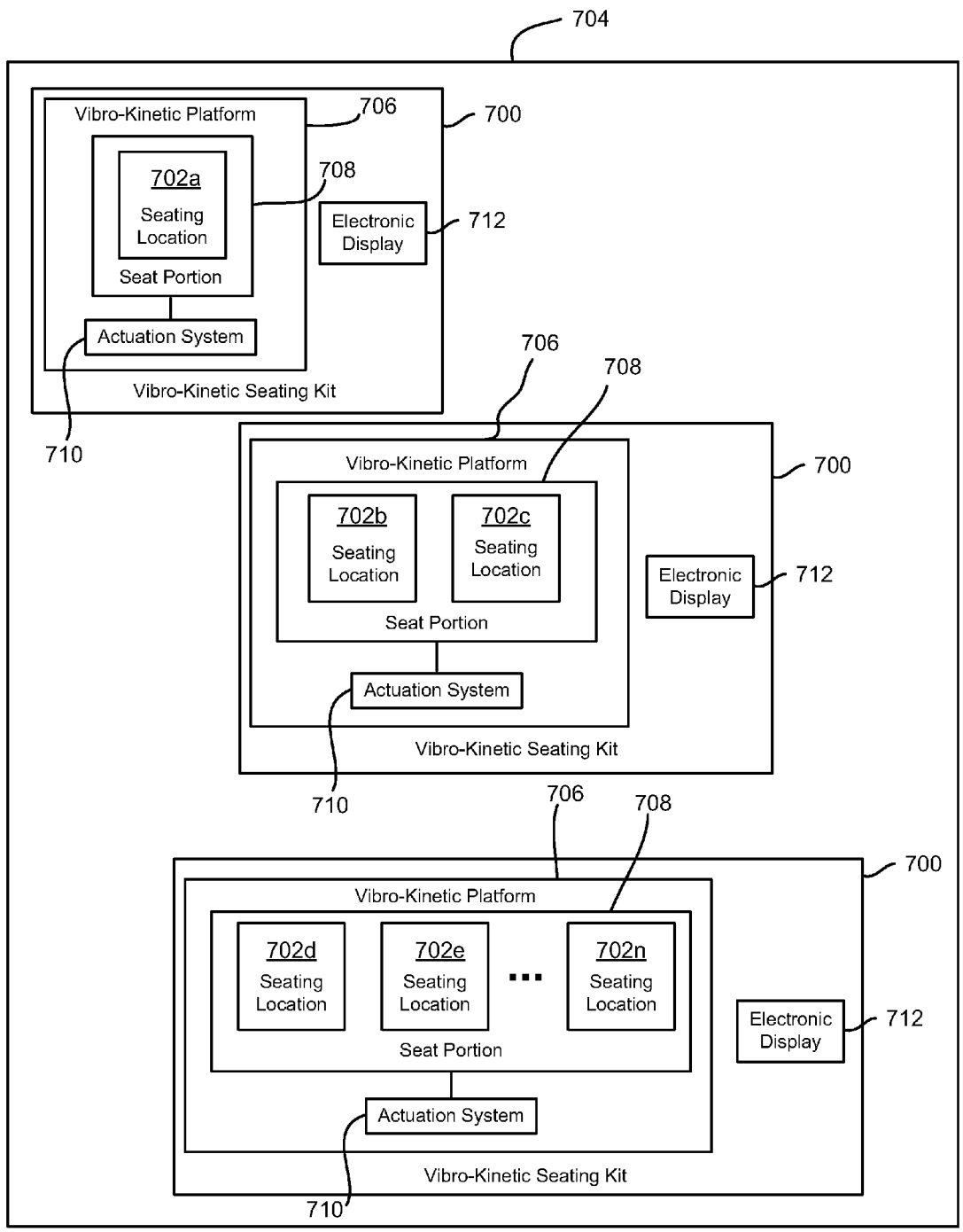
FIG. 7 is a block diagram of a vibro-kinetic kit according to an embodiment of the invention.

Now referring to FIG. 7, there is shown a vibro-kinetic seating kit 700 according to an embodiment of the invention. The vibro-kinetic seating kit 700 is for providing seating to a user at a seating location 702a in a multi-seating environment 704 comprising other seating locations 702b to 702n and for rendering a vibro-kinetic effect to the user.

The vibro-kinetic seating kit 700 comprises a vibro-kinetic platform 706 such as described above. The vibro-kinetic platform 706 comprises a seat portion 708 associated with the seating location 702a and for providing the seating to the user. The vibro-kinetic platform 706 further comprises an actuation system 710 mechanically connected to the seat portion 708 for rendering the vibro-kinetic effect to the user.

The vibro-kinetic seating kit 700 further comprises an electronic display 712, such as described earlier, associated to the vibro-kinetic platform 706 for receiving display data and for electronically showing visual information indicative of the display data which comprises an identification tag for the seating location 702a relative to the other seating locations 702b to 702n in the multi-seating environment 704.

Referring to FIG. 2, there is shown an actuation system 200 anchored to the floor using bolts 201-202 via anchor points (not visible) through anchor plates 203-204 (and another anchor plate which is not visible). Anchor plates 203-204 are fixed (e.g., welded) to a frame 205. The fixed portions 208a-b-c of the three electrical linear actuators 206a-b-c are fixed to the frame 205 using bolts 207a-b. Actuators 206a-b-c may be thereby be removed and replaced. During use of the vibro-kinetic platform 100, there is no relative movement between the fixed portions 208a-b-c of the three electrical linear actuators 206a-b-c and the frame.

The linear directions of movement of each of the actuators 206a-b-c define three linear axes which are substantially vertical (i.e., perpendicular) with respect to the ground or floor on which the vibro-kinetic platform is installed.

The mobile portions 209a-b-c of the actuators 206a-b-c are connected to the seat base 102 using link members 300a-b-c. In the embodiment shown in FIG. 2, the fixed portion 208a of the front actuators 206a is more distant from the ground than the fixed portions 208b-c of the two rear actuators 206b-c. This results in a rearward inclination of the seat base 102 when the actuators 206a-b-c are in their reference position. The inclination of the seat base 102 may be useful in providing a natural seating position to the user.

The person skilled in the art will understand that electrical linear actuators 206a-b-c can be replaced by any linear actuators powered by any other types of energies such as hydraulic, pneumatic, or thermal.

The function of controller 210 is to receive vibro-kinetic signals from an encoder (not shown) and interpret and transform the vibro-kinetic signals into drive signals for driving each actuator 206a-b-c.

The controller 210, or another electronic device with a processor and memory (not shown), may include functionalities related to the maintenance of the actuators 206a-b-c. This includes saving data in memory for download and analysis. The types of data include: time since installation, time since new, time under power, accelerations induced to the vibro-kinetic platform over time, number of movie representations shown, etc.

Figure 3:
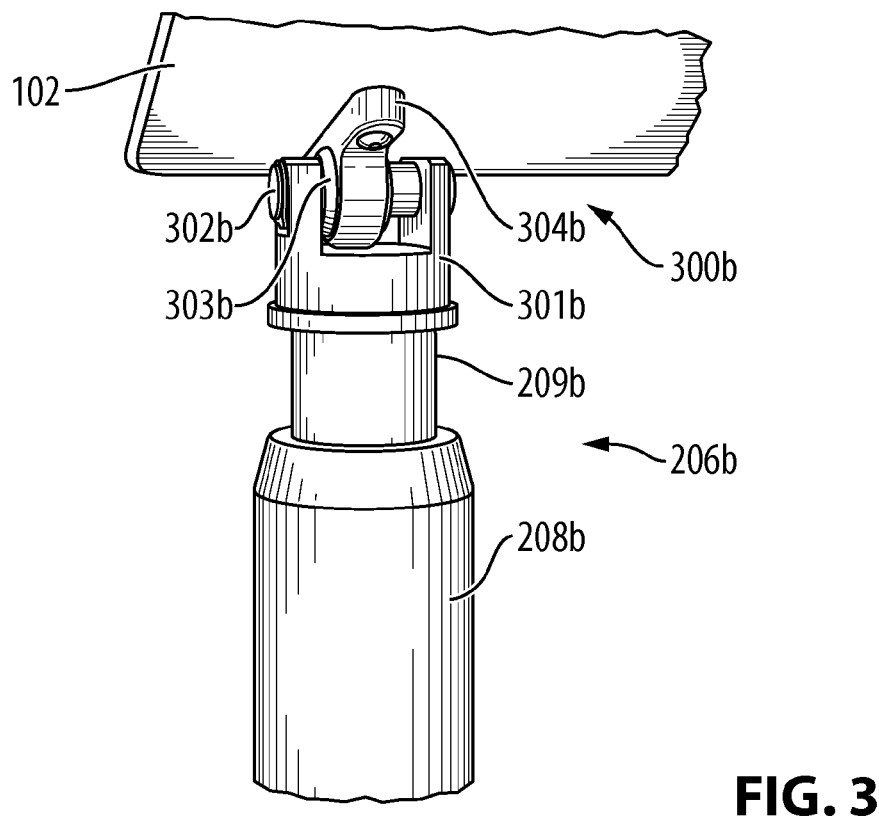
FIG. 3 is a perspective view of a rear link member according to an embodiment.
Figure 5:
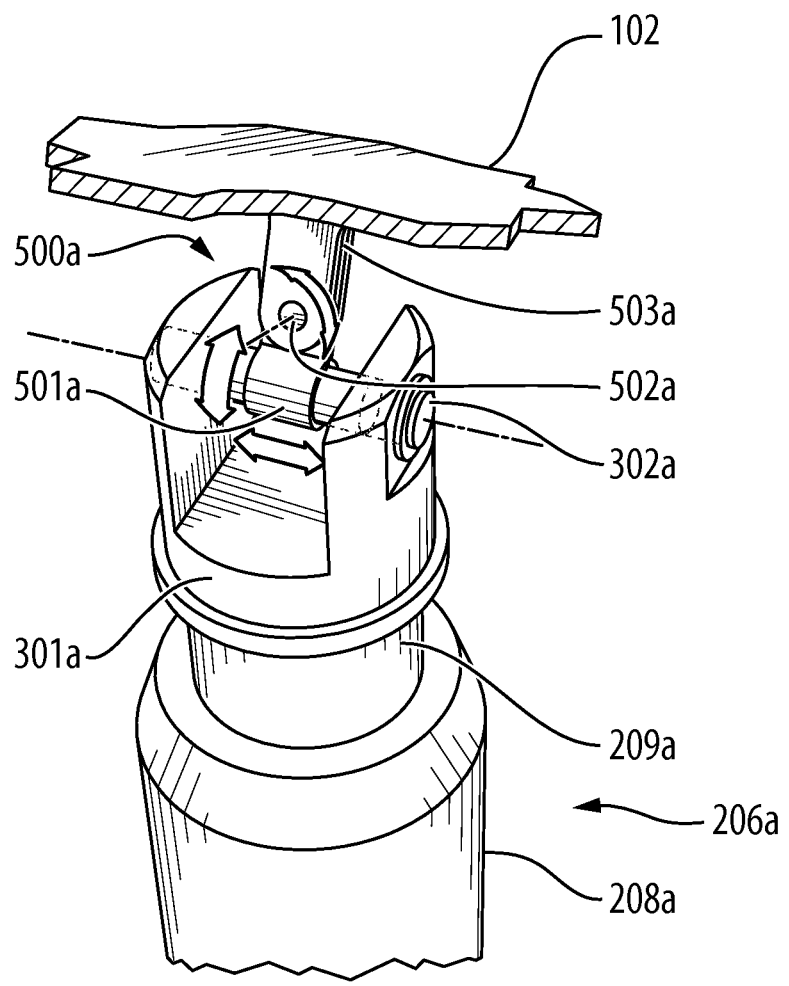
FIG. 5 is a perspective view of a front link member according to another embodiment.

Now referring to FIG. 3, there is shown the link member 300b between the actuator 206b and the seat base 102 located at the right rear corner of the seat base 102. The link member 300b comprises an eye connector 304b mounted on a ball 303b having a hole for admitting a shaft 302b therethrough. The eye connector 304b is screwed into the seat base 102. The ball 303b provides three rotational degrees of freedom. A person skilled in the art will understand that only two of the three rotational degrees of freedom could be used. An embodiment where only two rotational degrees of freedom are present is shown in FIG. 5.

The shaft 302b is mounted on a cradle 301b attached to the mobile portion 209b of the actuator 206b. The ball 303b is free to move on the shaft 302b. The movement of the ball 303b on the shaft 302b provides a translational degree of freedom along a longitudinal axis of the shaft 302b.

The longitudinal axis of the shaft 302b is from right to left of the seat base 102 from the point of view of the user.

Figure 4:
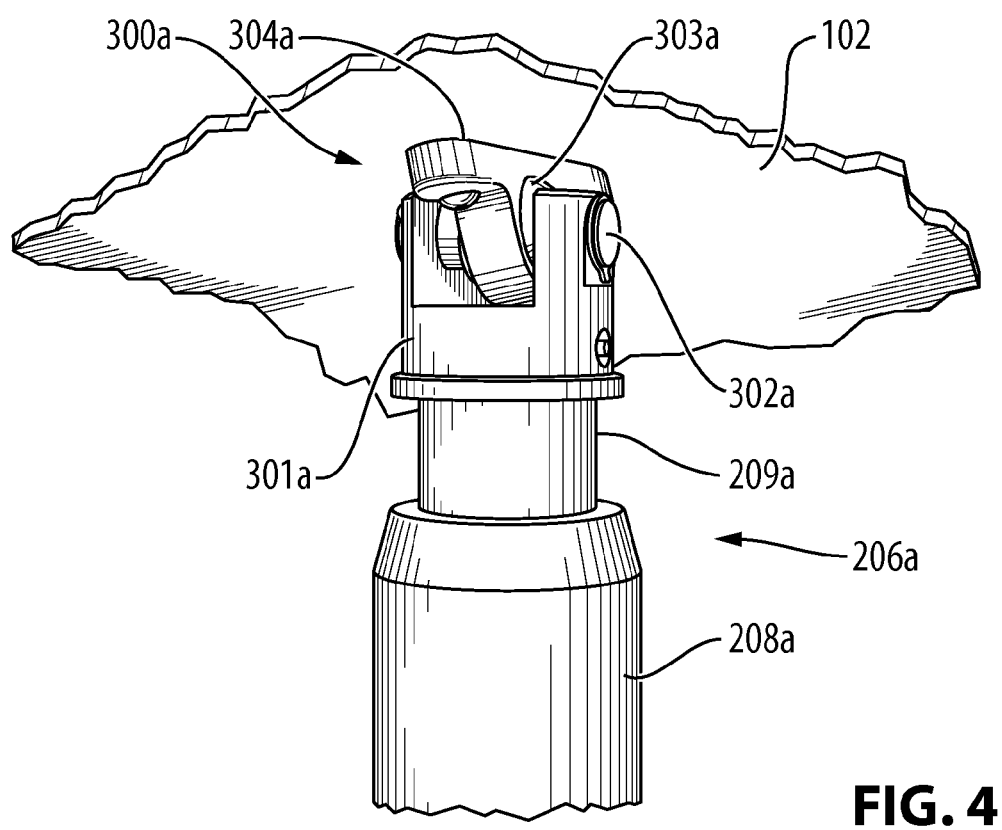
FIG. 4 is a perspective view of a front link member according to an embodiment.

Referring to FIG. 4, there is shown the link member 300a between the actuator 206a and the seat base 102 centered at the front of the seat base 102. The link member 300a comprises an eye connector 304a mounted on a ball 303a having a hole for admitting a shaft 302a therethrough. The eye connector 304a is screwed into the seat base 102. The ball 303a provides three rotational degrees of freedom.

The shaft 302a is mounted on a cradle 301a attached to the mobile portion 209a of the actuator 206a. The ball 303a is free to move on the shaft 302a. The movement of the ball 303a on the shaft 302a provides a translational degree of freedom along a longitudinal axis of the shaft 302a.

The longitudinal axis of the shaft 302a is from front to rear of the seat base from the point of view of the user. The actuator 206a is located in the middle of the front edge of the seat base 102 thereby providing free space on each side thereof for the legs of the user under the seat base 102.

The embodiment described is useful for inducing a vibro-kinetic effect to a user in two rotational degrees of freedom to pitch and roll and in one translational up/down degree of freedom.

Other embodiments are possible where only two actuators are used at the back of the seat base 102 and one fixed point of contact is present forward of the two actuators. Other possible embodiments would include only one actuator, possibly at the front of the seat base 102, and one or more fixed point of contact, possibly at the back of the seat base 102.

Now referring to FIG. 5, there is shown another embodiment of a link member 500a. In FIG. 5, link member 500a is installed between the actuator 206a and the seat base 102. Other link members which may be installed at the rear of seat base 102 are not shown.

In an embodiment, link member 500a would be attached at the center forward of the middle of the seat base 102. The link member 500a comprises a connector 503a mounted on a pivot joint 502a forming part of a sliding ring 501a for admitting a shaft 302a therethrough. The connector 503a is screwed into the seat base 102. The link member 500a provides two rotational degrees of freedom as shown by the curved arrows.

The shaft 302a is mounted on a cradle 301a attached to the mobile portion 209a of the actuator 206a. The sliding ring 501a is free to move on the shaft 302a. The movement of the sliding ring 501a on the shaft 302a provides a translational degree of freedom along a longitudinal axis of the shaft 302a.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A vibro-kinetic seating kit for providing seating to a user at a seating location in a multi-seating environment comprising other seating locations and for rendering a vibro-kinetic effect to the user synchronized with one of audio and video information provided to the user, the vibro-kinetic seating kit comprising:
 a vibro-kinetic platform comprising:
  a seat portion associated with the seating location and for providing the seating to the user; and
  an actuation system mechanically connected to the seat portion for rendering the vibro-kinetic effect to the user, the actuation system comprising a plurality of upstanding linear actuators concurrently producing at least two of pitch, roll and up/down movements of the seat portion for rendering the vibro-kinetic effect to the user, as synchronized with one of audio and video information provided to the user;
 a vibro-kinetic controller for receiving a vibro-kinetic signal and communicating the vibro-kinetic signal to the actuation system, the actuation system rendering the vibro-kinetic effect to the user based on the vibro-kinetic signal;
 a user input device for the user to communicate with the vibro-kinetic controller to modulate an intensity of the vibro-kinetic effect; and
 an electronic display associated to the vibro-kinetic platform for receiving display data and for electronically showing visual information indicative of the display data which comprises data indicative of the modulation of intensity of the vibro-kinetic effect.

2. The vibro-kinetic seating kit of claim 1, wherein the user input device is for receiving actions from the user and producing input commands based on the received actions.

3. The vibro-kinetic seating kit of claim 2, wherein the user input device comprises at least one of a touch screen, touch sensitive input device, a keyboard, a pointing device, a switch, a knob and a pushbutton.

4. The vibro-kinetic seating kit of claim 2, wherein the vibro-kinetic controller is for receiving at least one of the input commands and for altering the vibro-kinetic signal sent to the actuation system based on the at least one of the input commands thus altering the vibro-kinetic effect rendered to the user.

5. The vibro-kinetic seating kit of claim 4, wherein the at least one of the input commands is for controlling at least one of an intensity of vibration and an intensity of movement of the vibro-kinetic platform.

6. The vibro-kinetic seating kit of claim 2, wherein the display data further comprises at least one of:
   at least one of the input commands; and
   an operational state of the vibro-kinetic platform affected by at least one of the input commands.

7. The vibro-kinetic seating kit of claim 1, wherein the display data further comprises a reservation state indicative of whether or not the seating location is reserved for the user.

8. The vibro-kinetic seating kit of claim 1, further comprising an occupation detector for detecting the presence of the user in the seating location and for producing an occupation state indicative of the presence, and wherein the occupation state affects at least one of the visual information and a format of the visual information appearing on the electronic display.

9. The vibro-kinetic seating kit of claim 1, wherein the display data further comprises an operational state of the vibro-kinetic platform.

10. The vibro-kinetic seating kit of claim 1, wherein the electronic display is further for showing visual information which comprises at least one of: an error message, an advertisement, a user survey, an image, an animation, a game, instructions for operating the vibro-kinetic platform, emergency information and information concerning an event.

11. The vibro-kinetic seating kit of claim 10, wherein the visual information concerning an event comprises at least one of statistical data of the event, scheduling data of the event, a location of the event, images related to the event, and video related to the event.

12. The vibro-kinetic seating kit of claim 1, wherein the electronic display is installed on the seat portion.

13. The vibro-kinetic seating kit of claim 1, wherein the actuation system is anchored to the ground.

14. The vibro-kinetic seating kit of claim 1, wherein the plurality of upstanding linear actuators of the actuation system concurrently produce at least pitch, roll and up/down movements of the seat portion for rendering the vibro-kinetic effect to the user.

15. A vibro-kinetic seating kit for providing seating to a user and for rendering a vibro-kinetic effect to the user synchronized with one of audio and video information provided to the user, the vibro-kinetic seating kit comprising:
   a vibro-kinetic platform comprising:
      a seat portion for providing the seating to the user; and
      an actuation system mechanically connected to the seat portion for rendering the vibro-kinetic effect to the user, the actuation system comprising a plurality of upstanding linear actuators concurrently producing at least two of pitch, roll and up/down movements of the seat portion for rendering the vibro-kinetic effect to the user, as synchronized with one of audio and video information provided to the user;
   a vibro-kinetic controller for receiving a vibro-kinetic signal and communicating the vibro-kinetic signal to the actuation system, the actuation system rendering the vibro-kinetic effect to the user based on the vibro-kinetic signal;
   a user input device for the user to communicate with the vibro-kinetic controller to modulate an intensity of the vibro-kinetic effect; and
   an electronic display associated to the vibro-kinetic platform for showing visual information indicative of the modulation of intensity of the vibro-kinetic effect.

16. The vibro-kinetic seating kit of claim 15, wherein the event comprises one of a virtual game and a live event.

17. The vibro-kinetic seating kit of claim 15, wherein the actuation system is anchored to the ground.

18. The vibro-kinetic seating kit of claim 15, wherein the plurality of upstanding linear actuators of the actuation system concurrently produce at least pitch, roll and up/down movements of the seat portion for rendering the vibro-kinetic effect to the user.

* * * * *